United States Patent
Day et al.

(10) Patent No.: US 8,493,211 B2
(45) Date of Patent: Jul. 23, 2013

(54) PROVIDING EVENT INDICATIONS TO PREVENT INDICATION STORMS IN AN EVENT MODEL

(75) Inventors: Michael D. Day, Cary, NC (US); Venkateswara R. Puvvada, Inkollu (IN)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/885,224

(22) Filed: Sep. 17, 2010

(65) Prior Publication Data

US 2012/0068844 A1    Mar. 22, 2012

(51) Int. Cl.
    *G08B 21/00* (2006.01)
(52) U.S. Cl.
    USPC .............................. 340/540; 340/5.3; 340/506
(58) Field of Classification Search
    USPC .................. 340/540, 5.1–5.3, 5.33, 501, 506, 340/508, 517, 510
    See application file for complete search history.

(56) References Cited

U.S. PATENT DOCUMENTS

| 5,903,731 | A  | * | 5/1999  | Vincent et al. ................. 709/226 |
| 6,910,135 | B1 | * | 6/2005  | Grainger ........................ 726/23 |
| 7,068,998 | B2 | * | 6/2006  | Zavidniak ...................... 455/410 |
| 7,428,545 | B2 | * | 9/2008  | Bala ....................................... 1/1 |
| 7,561,991 | B2 | * | 7/2009  | Matsunaga et al. ............... 703/2 |
| 2005/0114487 | A1 |   | 5/2005  | Peng et al. |
| 2005/0278354 | A1 | * | 12/2005 | Gupta et al. .................. 707/100 |
| 2008/0134208 | A1 | * | 6/2008  | Lenharth et al. ............. 719/316 |
| 2008/0235363 | A1 |   | 9/2008  | Shah |

OTHER PUBLICATIONS

"CIM Event Model White Paper CIM Version 2.7 Document Version 2.1", Jun. 10, 2003, DMTF pp. 1-28.
CIM Indication Provider for events from the Event Manager, HP Technical Data Sheet, pp. 1-9, Aug. 28, 2007 http://docs.hp.com/en/diag/sfm/evm_cim_pds.pdf.
"Solaris WBEM Developer's Guide", Sun and Oracle Channel Sun pp. 1-12, retrieved Mar. 12, 2009 http://docs.sun.com/app/docs/doc/817-0366/solprovider-1?a=view.
"Work the CIM event model efficiently", IBM, pp. 1-10, retrieved Dec. 31, 2009 http://www.ibm.com/developerworks/linux/library/l-regeventhandler/index.html.

* cited by examiner

*Primary Examiner* — Daniel Previl
(74) *Attorney, Agent, or Firm* — Yee & Associates, P.C.; Tom Tyson

(57) ABSTRACT

A method, apparatus, and computer program product for providing event indications in an event model in a manner so that indication storms resulting from excessive indication generation and delivery is prevented. An object behavior change in an information model corresponds to an event. An indication of interest is sent to a listener process when the detected object behavior change corresponds to a specified top level indication class in an indication class hierarchy.

21 Claims, 7 Drawing Sheets

PROVIDING EVENT INDICATIONS TO PREVENT INDICATION STORMS IN AN EVENT MODEL

BACKGROUND

1. Field

The disclosure relates generally to data processing systems and information technology and more specifically to event models in an information technology environment in which events are represented by modeled indications.

2. Description of the Related Art

An information model is an abstraction that defines how managed elements in an information technology environment are represented as a set of objects and relationships between them. This abstraction is intended to allow consistent management of data processing system elements independent of their manufacturer or provider. An information model allows multiple parties to exchange information about managed elements. An information model also may provide the ability to actively control and manage such elements. By using a common model of information, management software can be written once and work with many implementations of the model without complex and costly conversion operations or loss of information.

An example of an information model is the Common Information Model (CIM). The Common Information Model is an open standard defined and published by the Distributed Management Task Force (DMTF). A related standard is Web-Based Enterprise Management (WBEM), also defined by DMTF. Web-Based Enterprise Management defines a particular implementation of the Common Information Model, including protocols for discovering and accessing such Common Information Model implementations.

The Common Information Model standard includes an infrastructure specification and a schema. The Common Information Model infrastructure specification defines the architecture and concepts of the model, including a language by which the schema is defined, and a method for mapping the Common Information Model to other information models, such as Simple Network Management Protocol (SNMP). The Common Information Model architecture is based upon Unified Modeling Language (UML), so it is object-oriented. Managed elements are represented in the model as Common Information Model classes. Relationships between elements are represented as Common Information Model associations. Inheritance allows specialization of common base elements into more specific derived elements.

The Common Information Model schema is a conceptual schema which defines the specific set of objects and relationships between them that represent a common base for the managed elements in an information technology environment. The schema covers most elements in an information technology environment, such as computer systems, operating systems, networks, middleware, services, and storage. The schema defines a common basis for representing these managed elements. Since most managed elements have product and vendor specific behavior, the schema is extensible in order to allow the producers of these elements to represent their specific features seamlessly together with the common base functionality defined in the schema.

In an information technology context, an event can be defined as a change in state. For example, when a service is started, its state is changed from "stopped" to "started". When a plug-and-play device is added to a data processing system, the state of the system hardware configuration is changed. Alternatively, events can be defined as the occurrence of phenomena of interest. For example, an event can denote the occurrence of a disk write error, a failed authentication attempt, or even a mouse click. An event may be a pervasive incident that occurs infrequently, such as a system re-boot. Alternatively, events may reflect very small scale, frequently occurring incidents, like mouse clicks.

The way events are handled can vary. Some events may require immediate action on the part of the observer. For other types of events, the action may be deferred until a later time. For example, an "out of disk space" event on a Web server may require immediate action to make disk space available. An event indicating that an application has exceeded expected processor utilization can be handled as part of nightly billing reconciliation.

The Common Information Model includes an event model that defines event-related abstractions. The event model defines an indication hierarchy and the use of indications to model events. An event is defined to be the occurrence of a phenomenon of interest. Examples of events include: the failure of a hardware device, the exceeding of an acceptable resource utilization threshold, or the successful completion of the installation of a product. An indication, on the other hand, is a record of the detection of an event of interest. There is not necessarily a one-to-one correspondence between events and indications. In particular, zero or more indications can be generated for the same underlying event. Two indications are correlated if they do not represent the same underlying event, but there is a relationship between the events they represent.

The Common Information Model indication hierarchy is used to describe the types of events that can be detected and modeled as indications. An abstract class, CIM_Indication, serves as the base class for all indication classes. It includes an indication identifier, an indication time, and correlated indications. Although indications are not guaranteed to be uniquely identifiable, the indication identifier property can be used for identification. If indication correlations are reported, the indication identifier value should be unique. Indication time describes, to the extent possible, the time of the underlying event. Correlated indications are indications that are correlated with an indication, specified by indication identifier.

Types of indications, representing different types of events, are modeled as CIM_Indication subclasses. These subclasses include:

CIM_InstIndication. Used to report Common Information Model instance life cycle events, that is, change of state events. The types of events include: instance creation, deletion, and modification, method invocation and read access. Types of CIM_InstIndication include: CIM_InstCreation, CIM_InstDeletion, CIM_InstModification, CIM_InstMethodCall and CIM_InstRead.

CIM_ClassIndication. Used to report Common Information Model class definition life cycle events. The types of events include: class creation, deletion and modification. Types of CIM_ClassIndication include: CIM_ClassCreation, CIM_ClassDeletion and CIM_ClassModification.

CIM_ProcessIndication. Used to report the occurrence of a phenomenon of interest. This includes alert or notification type events. Types of CIM_ProcessIndication include: CIM_SNMPTrapindication and CIM_AlertIndication.

An instance of CIM_Indication represents the occurrence of an event. Typically, indications are very short-lived transient objects used to communicate information from an indication generator to zero or more indication consumers.

A subscription portion of the Common Information Model event schema defines how clients subscribe to receive indications. A client process activates a subscription by creating an instance of CIM_IndicationSubscription that defines the subscription. Instances of the CIM_IndicationSubscription association class are used to register to receive indications. In a subscription, a CIM_IndicationFilter instance describes characteristics of a desired set of indications. A CIM_IndicationHandler instance describes the target destination of the indications and a communication protocol. Thus, an instance of CIM_IndicationSubscription defines an association between a CIM_IndicationFilter instance and a CIM_IndicationHandler instance. Indications are sent only if there is an instance of CIM_IndicationSubscription that requests delivery of the indication. Only an indication that matches the condition defined by the CIM_IndicationFilter instance is dispatched. If dispatched, the indication is dispatched only to the destination defined by the CIM_IndicationHandler instance.

For example, a client interested in a particular event subscribes to a running server on a particular managed system. When the client creates the subscription for the event, it specifies a filter and a handler. The filter defines evaluation criteria for the event. The handler defines the destination to which an indication that satisfies the evaluation criteria will be sent. The destination is known as the listener. The listener may be the client who creates the subscription or may be different. A resource monitor part of the server, or a module that is shipped with the server on a particular system, monitors system resources as requested by the client. Whenever an event of interest is generated, the server evaluates the event to check to see if it meets the requirements imposed by the client. If the requirements are satisfied, a corresponding indication is sent to the listener.

SUMMARY

According to one embodiment, a method of providing event indications in an event model prevents indication storms resulting from excessive generation and delivery of indications. An object behavior change in an information model corresponds to an event. An object behavior change is detected, and an indication of interest is sent to a listener process when the detected object behavior change corresponds to a specified top level indication class in an indication class hierarchy.

According to another embodiment, a computer program product comprises a computer readable storage medium having stored thereon computer program instructions for controlling a data processing system to provide event indications in an event model. Computer program instructions are stored on the computer readable storage medium for controlling the data processing system to detect an object behavior change in an information model, wherein the object behavior change corresponds to an event, and to send an indication of interest to a listener process when the detected object behavior change corresponds to a specified top level indication class in an indication class hierarchy.

According to a further embodiment, a data processing system is adapted to detect an object behavior change in an information model, wherein the object behavior change corresponds to an event, and to send an indication of interest to a listener process when the detected object behavior change corresponds to a specified top level indication class in an indication class hierarchy.

Further objects, features, and advantages will be apparent from the following detailed description and with reference to the accompanying drawings.

DETAILED DESCRIPTION

The different illustrative embodiments recognize and take into account a number of different considerations. For example, the different illustrative embodiments recognize and take into account that indications in an event model provide the most value when they are used by a client as a mechanism to identify a number of changes in data processing system or network elements of interest. In order to capture a wide variety of changes, any of which may be pertinent to the client process, the client is likely to create many indication subscriptions and keep them all active simultaneously. This approach is not problematic in most cases, because the number of management related changes to any device or application in the network is usually very small. However, there are several possible situations in which an excessive number of indications can be produced. In these situations, the excessive number of indications may potentially overload the network, the originating event model object manager, and the receiving listener's resources.

For example, the different illustrative embodiments recognize and take into account that an event model, such as the Common Information Model event model, supports lifecycle and other indications where creation of one instance may result in the creation of many instances. This may cause many lifecycle instance creation indications to be sent. Similarly, a state change in the model for a device or application may result in many alert indications being sent. For example, the addition of a device or application representation to a Common Information Model object manager may result in creation indications for every single member instance of that device or application. The worst case risk is that several situations of this type may occur simultaneously. This may result in a sudden surfeit of indications on a network, known as an indication storm, resulting in the sudden saturation of the network. Such an indication storm may result also in unacceptably high usage levels on the computing resources producing the indications or of the listener receiving the indications. Indication storm effects may be made even worse if the object manager implements delivery retry of indications that fail to be delivered or for which a destination is not reachable.

Figure 1:
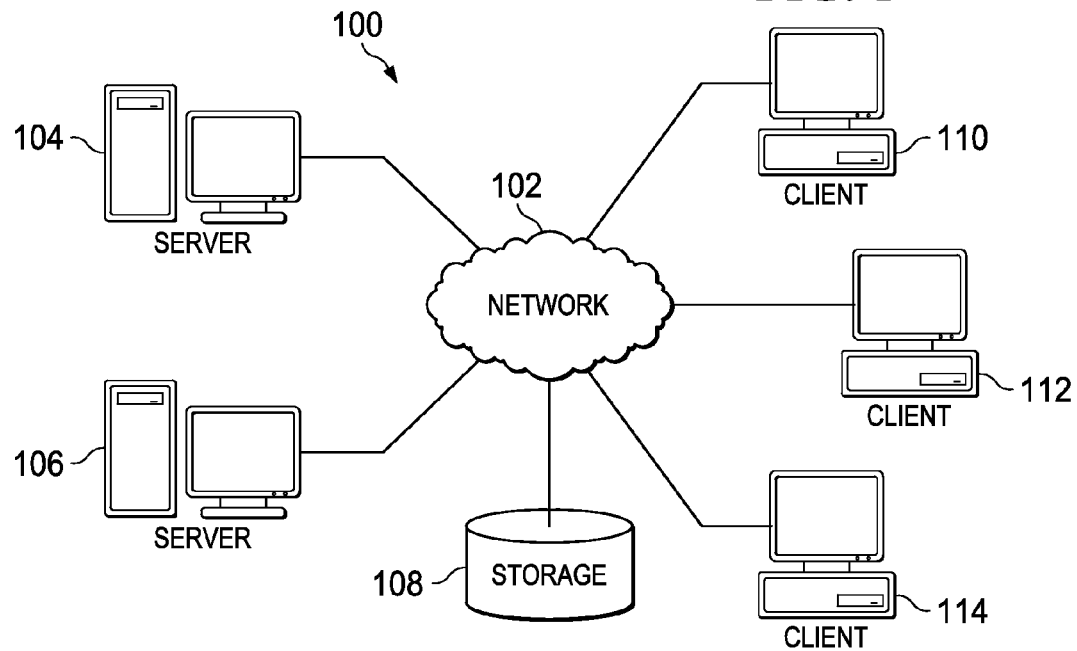
FIG. 1 is a diagram of a data processing environment in which illustrative embodiments may be implemented

With reference now to the figures, and in particular with reference to FIG. 1, a diagram of a data processing environment is provided in which illustrative embodiments may be implemented. It should be appreciated that FIG. 1 is provided as an illustration of only one possible implementation and is not intended to imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which the illustrative embodiments may be implemented. Network data processing system 100 contains network 102. Network 102 is the medium used to provide communication links between various devices and computers connected together within network data processing system 100. Network 102 may include connections, such as wire connections, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 may be the Internet. In this case, network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
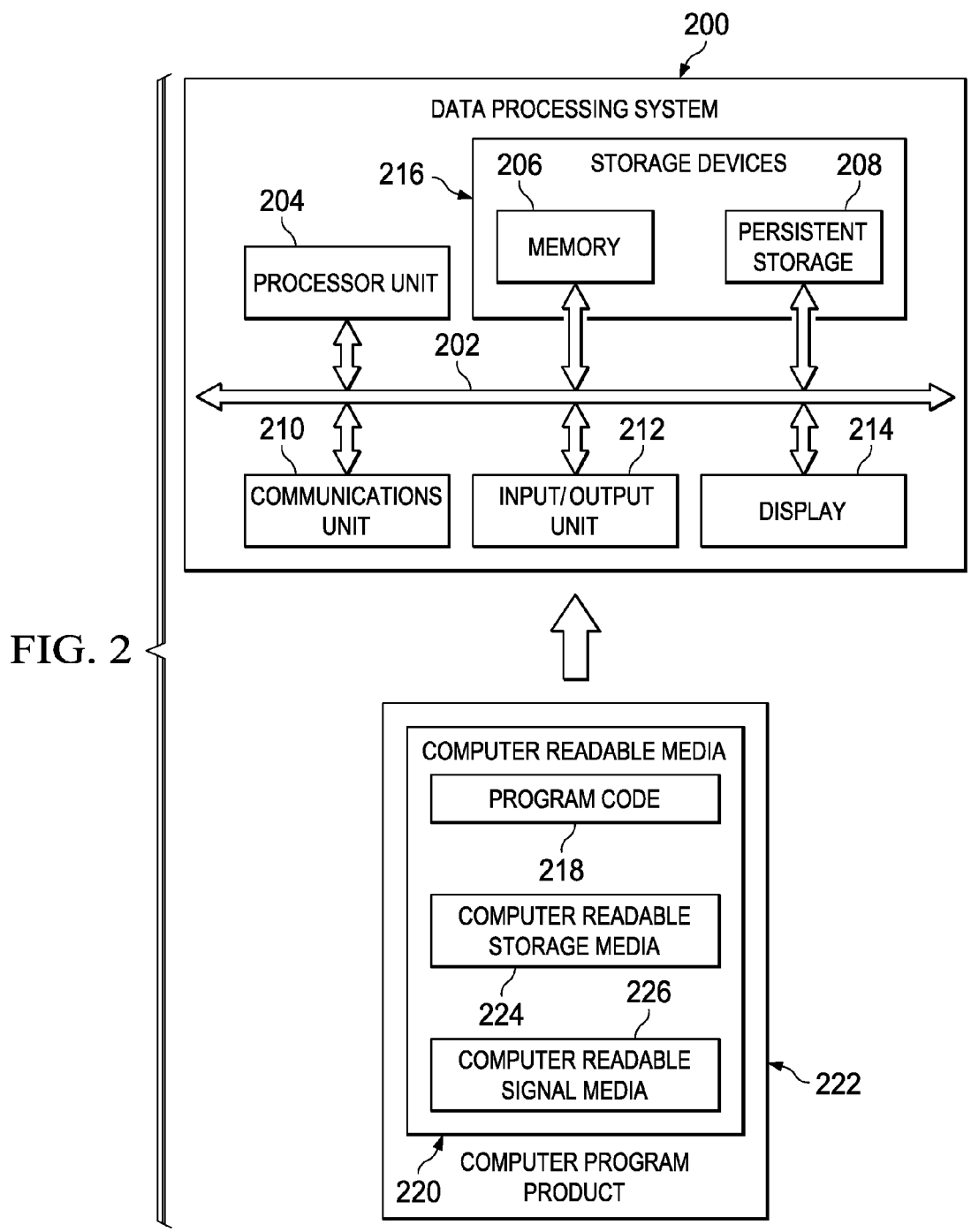
FIG. 2 is a block diagram of a data processing system depicted in accordance with an illustrative embodiment.

Turning now to FIG. 2, an illustration of a data processing system is depicted in accordance with an illustrative embodiment. In this example, data processing system 200 is one example of a possible implementation of server computers 104 and 106 or client computers 110, 112, and 114 in FIG. 1. In this illustrative example, data processing system 200 includes communications fabric 202. Communications fabric 202 provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may include a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system including multiple processors of the same type.

Memory 206 and persistent storage 208 are examples of storage devices 216. A storage device is any piece of hardware that is capable of storing information, such as, for example, without limitation, data, program code in functional form, and/or other suitable information, either on a temporary basis and/or on a permanent basis. Memory 206, in these examples, may be, for example, a random access memory or any other suitable volatile or non-volatile storage device. Persistent storage 208 may take various forms, depending on the particular implementation.

Persistent storage 208 may include one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communications with other data processing systems or devices. In these examples, communications unit 210 may be a network interface card. Communications unit 210 may provide communications through the use of either or both physical and wireless communications links. In this example, communications unit 210 may provide communications via network 102 in FIG. 1.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for an operating system, applications, and/or programs may be located in storage devices 216, which are in communication with processor unit 204 through communications fabric 202. In these illustrative examples, instructions are stored in a functional form on persistent storage 208. These instructions may be loaded into memory 206 and run by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. Program code in the different embodiments may be embodied on different physical or computer readable storage media, such as memory 206 or persistent storage 208.

Program code 218 may be located in a functional form on computer readable media 220. Computer readable media 220 may be selectively removable and program code 218 may be loaded onto or transferred to data processing system 200 from computer readable media 220 and run by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer of program code 218 onto a storage device, such as a hard drive, that is part of persistent storage 208. Computer readable storage media 224 also may take the form of persistent storage, such as a hard drive, a thumb drive, or a flash memory, that is connected to data processing system 200. In some instances, computer readable storage media 224 may not be removable from data processing system 200. Computer readable storage media 224 specifically excludes mere propagating signals.

Alternatively, program code 218 may be transferred to data processing system 200 using computer readable signal media 226. Computer readable signal media 226 may be a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network from another device or data processing system through computer readable signal media 226 to persistent storage 208 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. Different advantageous embodiments may be implemented in a data processing system including components in addition to or in place of those illustrated for data processing system 200. Other components shown in FIG. 2 may be varied from the illustrative examples shown. Different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 may be any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. The bus system may be implemented using any suitable type of architecture that provides for a transfer of data between different components or devices attached to the bus system. Additionally, communications unit 210 may include one or more devices used to transmit and receive data, such as a modem or a network adapter. Further, a memory may be, for example, memory 206, or a cache such as found in an interface and memory controller hub that may be present in communications fabric 202.

Figure 3:
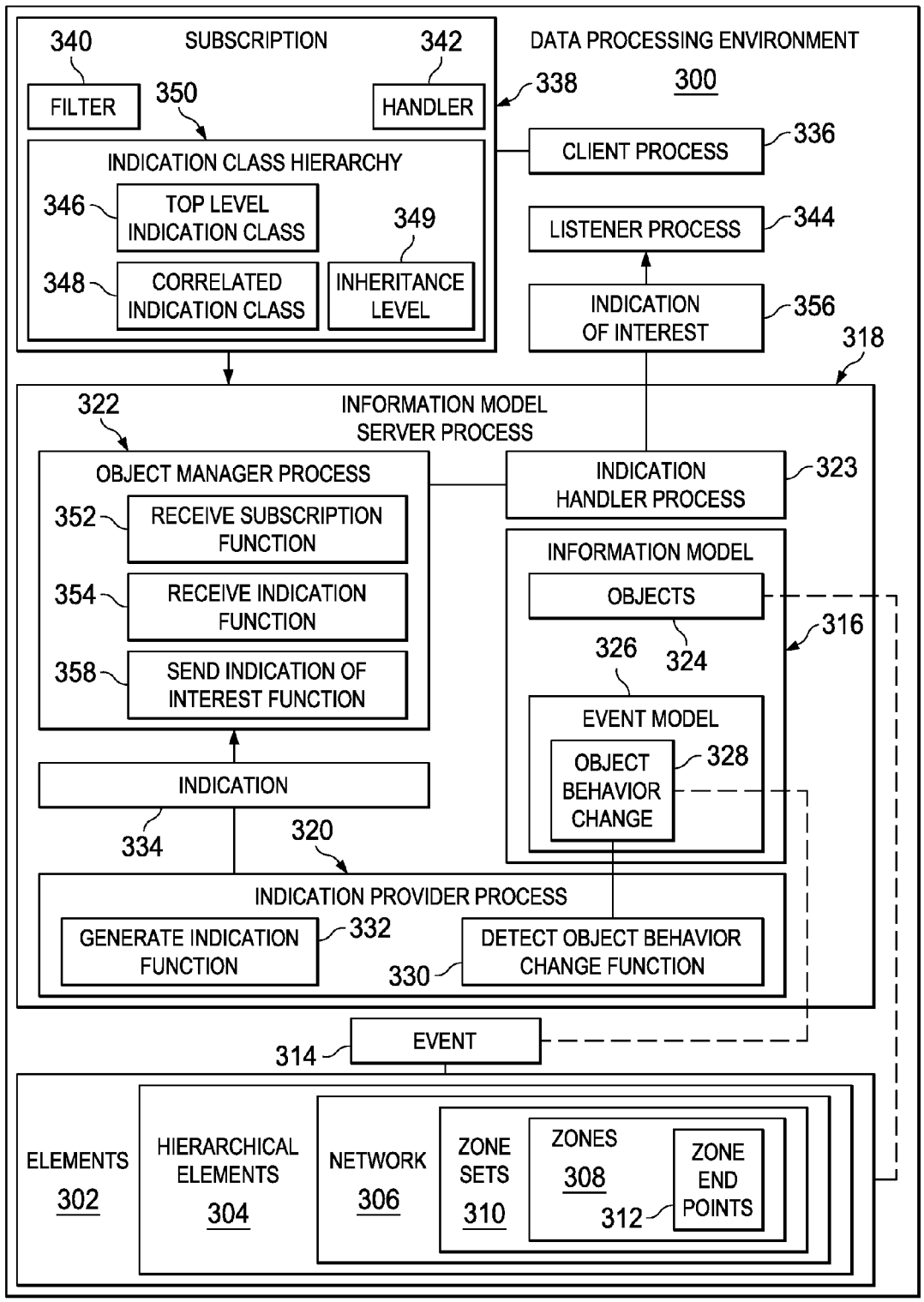
FIG. 3 is a functional block diagram of a system for providing event indications implemented in a data processing environment in accordance with an illustrative embodiment.

A data processing environment in which a system and method is implemented for providing event indications to prevent indication storms in an event model in accordance with an illustrative embodiment is depicted in FIG. 3. In this example, data processing environment 300 may include any information technology environment in which events may be monitored using an event model. For example, data processing environment 300 may be an example of one implementation of network data processing system 100 in FIG. 1 or of any other network data processing system.

Data processing environment 300 includes various elements 302. Elements 302 may include various individual components that form data processing environment 300 or a portion of data processing environment 300. For example, elements 302 may include individual devices, structures, and functions of data processing environment 300. Elements 302 also may include various groups or sets of components that form data processing environment 300.

Some elements 302 may be related to each other in such a way as to form hierarchical elements 304. Hierarchical elements 304 include elements 302 that are related to each other at various levels forming a hierarchy. Hierarchical elements 304 thus include one or more elements 302 at a top level of a hierarchy and one or more elements 302 at lower levels in the hierarchy. Elements 302 at lower levels of the hierarchy are parts of elements 302 at higher levels of the hierarchy and at the top level of the hierarchy.

As an example, hierarchical elements 304 may include various elements 302 related to a network 306. Network 306 may be divided into various zones 308. Groups of zones 308 may be combined in various combinations to form zone sets 310. In turn, zones 308 include various zone end points 312. For example, zone end points 312 may include individual systems or devices that are coupled to network 306. Each of the zone sets 310, zones 308, and zone end points 312 may be one of elements 302. In this case, zone sets 310, zones 308, and zone end points 312 are hierarchical elements 304. Zone sets 310 are at the top level of the hierarchy. Zones 308 and zone end points 312 are parts of zone sets 310. Thus, zones 308 and zone end points 312 are at lower levels in the hierarchy.

A change in state of any one of elements 302 is referred to as an event 314. For example, event 314 may be the adding, removing, starting, or stopping of any one of elements 302 or any other state change of any one of elements 302.

In accordance with an illustrative embodiment, elements 302 may be modeled by information model 316. Information model 316 is implemented by information model server process 318. Information model server process 318 includes various functions for implementing information model 316 in data processing environment 300. These functions include functions implemented by indication provider process 320, object manager process 322, and indication handler process 323. Indication provider process 320, object manager process 322, and indication handler process 323 may be implemented as part of information model server process 318 and will be described in more detail below.

Information model server process 318 may be implemented in software running on one or more computer systems in data processing environment 300. For example, information model server process 318 may be implemented in software running on server computer 104 or 106 in FIG. 1. Information model server process 318 may be implemented in software running on any appropriate data processing system, such as data processing system 200 in FIG. 2.

Information model 316 may be an object oriented model in which elements 302 are represented as objects 324 in information model 316. The hierarchical relationship between hierarchical elements 304 may be represented by a corresponding hierarchical relationship between corresponding objects 318 in information model 316. An example of such an information model 316 is the Common Information Model. However, illustrative embodiments are not limited to applications using the Common Information Model.

Information model 316 includes event model 326. Event model 326 incorporates each event 314 associated with elements 302 into information model 316. As discussed above, elements 302 are represented as objects 324 in information model 316. Event 314 is a change in state of one of elements 302. Therefore, event 314 corresponds to object behavior change 328 in at least one of objects 324 in information model 316. Object behavior change 328 may include any change to one or more objects 324 in information model 316 resulting from event 314. For example, object behavior change 328 may include the creation, deletion, modification, access, or enumeration of one or more objects 324.

Indication provider process 320 includes detect object behavior change function 330 and generate indication function 332. Detect object behavior change function 330 detects the occurrence of object behavior change 328 in information model 316. Generate indication function 332 generates indication 334 in response to the detection of object behavior change 328 by detect object behavior change function 330. Indication 334 corresponds to the detected object behavior change 328 resulting from event 314 and thus reports the occurrence of event 314. As discussed above, objects 324 may have a hierarchical relationship that reflects the relationship of hierarchical elements 304 represented by objects 324. Indication 334 may reflect a level in a hierarchical relationship of objects 324 of object behavior change 328 reported by indication 334.

Client process 336 may be interested in the occurrence of event 314. For example, client process 336 may be interested in the occurrence of event 314 as part of a process for monitoring and managing elements 302 of data processing environment 300. Client process 336 may be implemented in software running on one or more computer systems in data processing environment 300. Alternatively, client process 336 may be implemented in software running on one or more computer systems that are outside of data processing system environment 300 but connected to data processing system environment 300. Client process 336 may be implemented in software running on any appropriate data processing system, such as data processing system 200 in FIG. 2.

Client process 336 subscribes to receive indication 334 corresponding to the occurrence of event 314 by generating subscription 338 and providing subscription 338 to information model server process 318. Subscription 338 includes filter 340 and handler 342. Filter 340 defines evaluation criteria for event 314 in which client process 336 is interested. Handler 342 defines a destination to which an indication that satisfies the evaluation criteria defined by filter 340 is sent. The destination defined by handler 342 may be listener process 344. Listener process 344 may be part of client process 336 or separate from client process 336. Listener process 344 may be implemented in the same manner as client process 336.

In accordance with an illustrative embodiment, subscription 338 also may include top level indication class 346. If subscription 338 includes top level indication class 346, subscription 338 may include correlated indication class 348 or inheritance level 349.

Subscription 338 may include zero, one, or more than one correlated indication class 348. Top level indication class 346 and correlated indication class 348 are related to each other in terms of indication class hierarchy 350. Top level indication class 346 is above correlated indication class 348 at a higher level in indication class hierarchy 350. Correlated indication class 348 is incorporated in top level indication class 346 and thus is below top level indication class 346 at a lower level in indication class hierarchy 350. Levels of indication class hierarchy 350 may correspond to levels in a hierarchy of objects 324 in information model 316.

Subscription 338 may include zero, one, or more than one inheritance level 349 instead of correlated indication class 348. Inheritance level 349 is an indication of a level in the indication class hierarchy 350 that includes top level indication class 346. Inheritance level 349 may be, for example, an alphanumeric or other indication of a level in indication class hierarchy 350. The specification of top level indication class 346 in subscription 338 identifies indication class hierarchy 350. In accordance with an illustrative embodiment, inheritance level 349 may be used in subscription 338 to refer to a correlated indication class in indication class hierarchy 350 without specifically naming the correlated indication class.

Object manager process 322 includes receive subscription function 352 for receiving subscription 338 from client process 336. Object manager process 322 also includes receive indication function 354 for receiving indication 334 from indication provider process 320. If indication 334 satisfies subscription 338, indication 334 is an indication of interest 356. Object manager process 322 includes send indication of interest function 358. Send indication of interest function 358 sends indication of interest 356 to listener process 344 as identified by handler 342. Send indication of interest function 358 sends indication of interest 356 to indication handler process 323 for delivery of indication of interest 356 to listener process 344.

Indication 334 is sent as indication of interest 356 to listener process 344 only if indication 334 satisfies the evaluation criteria specified by filter 340. In accordance with an illustrative embodiment, if subscription 338 includes top level indication class 346, indication 334 is sent as indication of interest 356 to listener process 344 only if indication 334 corresponds to top level indication class 346. Furthermore, if indication 334 corresponds to top level indication class 346, then indication of interest 356 is sent to listener process 344 also for each correlated indication class 348 specified in subscription 338. As discussed above, correlated indication class 348 may be specified directly in subscription 338 or may be specified by inheritance level 349.

By specifying top level indication class 346 and correlated indication class 348 or inheritance level 349 in subscription 338, client process 336 can reduce the number of indications that are sent to listener process 344 in some cases where excessive generation and delivery of indications can otherwise result in an indication storm. In some cases, an object behavior change in an object at a top level of an object hierarchy is reflected in object behavior changes in all of the objects in the hierarchy below the top level object. This can result in the generation and delivery of a large number of indications in a short period of time using conventional methods. However, in accordance with an illustrative embodiment, the number of indications sent in such a situation can be limited by specifying top level indication class 346 and correlated indication class 348 or inheritance level 349 in indication class hierarchy 350 for which indications are to be sent. A specific example application of a method of providing event indications in accordance with an illustrative embodiment is presented in detail below.

The illustration of FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in accordance with illustrative embodiments, subscription 338 may include both top level indication class 346 and correlated indication class 348 or inheritance level 349, as illustrated. However, for some applications or instances, neither correlated indication class 348 nor inheritance level 349 may be specified in subscription 338.

In accordance with another advantageous embodiment, a determination of whether object behavior change 328 corresponds to specified top level indication class 346 is made at indication provider 320. In this case, generate indication function 332 may only generate indication 334 if detected object behavior change 328 does correspond to specified top level indication class 346. This embodiment provides for further processor savings, since an indication that does not correspond to specified top level indication class 346, and thus will not be sent to listener process 344, need not be generated in the first place.

Figure 4:
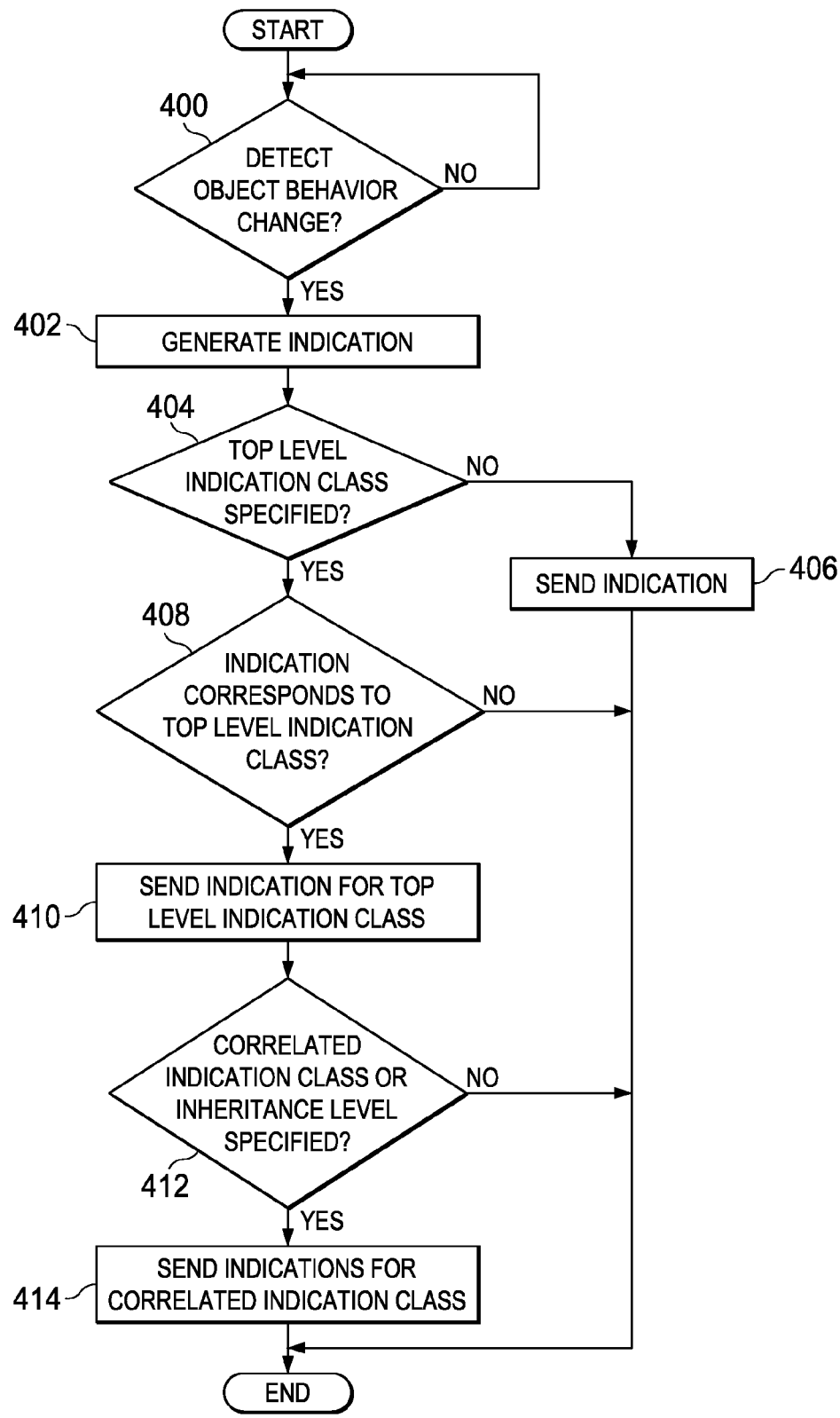
FIG. 4 is a flowchart of a method of providing event indications in accordance with an illustrative embodiment.

FIG. 4 is a flowchart of a method of providing event indications in accordance with an illustrative embodiment. In this illustrative embodiment, an indication is generated in response to a detected object behavior change and the indication is sent to a listener process when the indication corresponds to a specified top level indication class. The method illustrated in FIG. 4 assumes that any indication sent to a listener process satisfies any evaluation criteria specified in a subscription filter. In accordance with an illustrative embodiment, in one implementation, the method of FIG. 4 may be implemented in information model server process 318 in FIG. 3.

In accordance with an illustrative embodiment, a method of providing an event indication begins with detecting an object behavior change in an information model (step 400). As discussed above, a detected object behavior change corresponds to a detected event. An indication is generated in response to detecting an object behavior change (step 402).

It is determined whether a top level indication class is specified in the subscription for the indication (step 404). If a top level indication class is not specified, and assuming that the indication satisfies evaluation criteria specified in a filter, the indication may be sent to a listener process as specified in a handler (step 406). The process then ends for this event.

If a top level indication class is specified, it is determined whether the indication corresponds to the specified top level indication class (step 408). If the indication does not correspond to the specified top level indication class, the indication is not sent, and the process ends for this event. If the indication does correspond to the specified top level indication class, the indication for the top level indication class is sent to the listener process (step 410).

It is determined whether at least one correlated indication class or inheritance level is specified in the subscription (step 412). If no correlated indication class or inheritance level is specified, the process ends for this event. If a correlated indication class or inheritance level is specified, indications are sent for each correlated indication class specified or identified by inheritance level (step 414). The process then ends for this event. The process may be repeated each time an object behavior change in the information model is detected.

Figure 5:
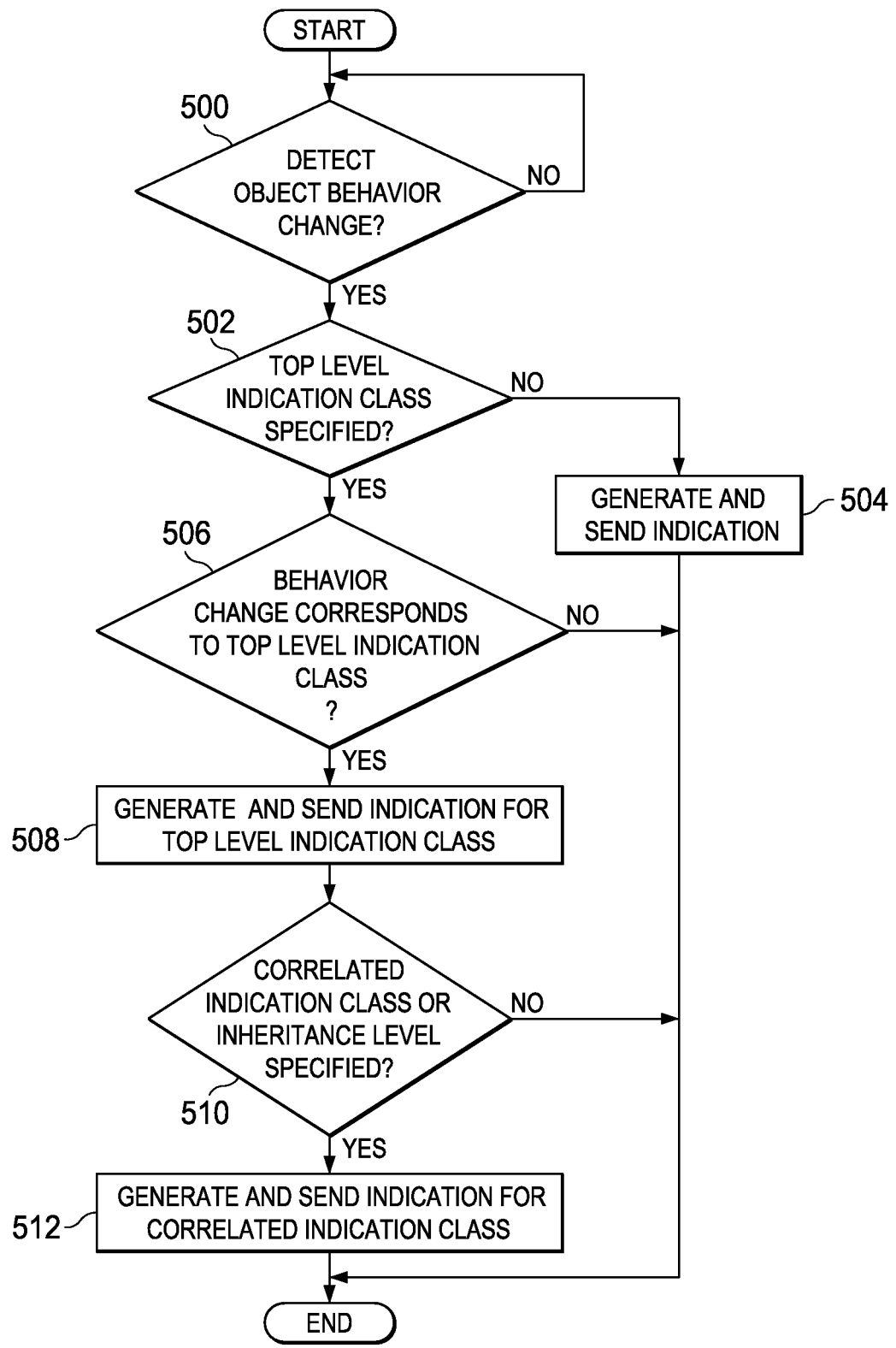
FIG. 5 is a flowchart of a method of providing event indications in accordance with another illustrative embodiment.

FIG. 5 is a flowchart of another method of providing event indications in accordance with an illustrative embodiment. In this illustrative embodiment, an indication is generated in response to a detected object behavior change when the object behavior change corresponds to a specified top level indication class. The method illustrated in FIG. 5 also assumes that any indication sent to a listener process satisfies any evaluation criteria specified in a subscription filter. In accordance with an illustrative embodiment, in one implementation, the method of FIG. 5 may be implemented in information model server process 318 in FIG. 3.

In accordance with an illustrative embodiment, a method of providing an event indication begins with detecting an object behavior change in an information model (step 500). As discussed above, a detected object behavior change corresponds to a detected event.

It is determined whether a top level indication class is specified in the subscription (step 502). If a top level indication class is not specified, and assuming that the object behavior change satisfies evaluation criteria specified in a filter, an indication may be generated and sent to a listener process as specified in a handler (step 504). The process then ends for this event.

If a top level indication class is specified, it is determined whether the detected object behavior change corresponds to the specified top level indication class (step 506). If the object behavior change does not correspond to the specified top level indication class, no indication is generated or sent, and the process ends for this event. If the object behavior change does correspond to the specified top level indication class, an indication for the top level indication class is generated and sent to the listener process (step 508).

It is determined whether at least one correlated indication class or inheritance level is specified in the subscription (step 510). If no correlated indication class or inheritance level is specified, the process ends for this event. If a correlated indication class or inheritance level is specified, indications are sent for each correlated indication class specified or identified by inheritance level (step 512). The process then ends for this event. The process may be repeated each time an object behavior change in the information model is detected.

An example application of an illustrative embodiment will be described now. In this example, an illustrative embodiment is implemented in a Common Information Model. It should be understood that other embodiments may be implemented in any information or event model where it is desired to generate and deliver event indications in a manner that prevents indication storms.

Figure 6:
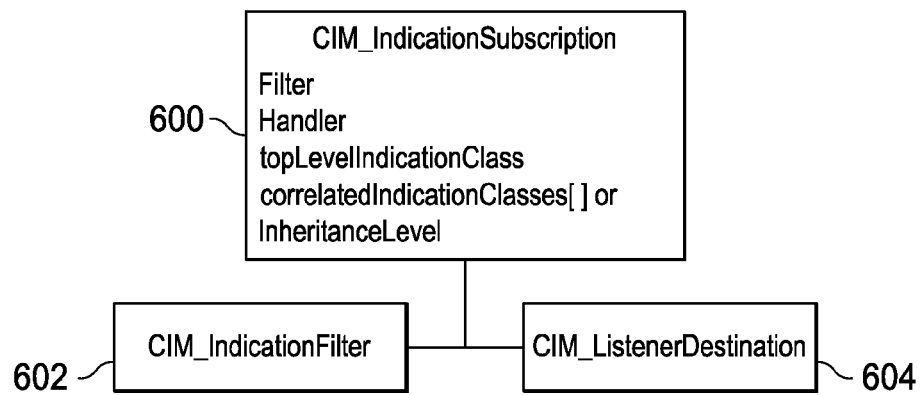
FIG. 6 illustrates an event indication subscription in accordance with an illustrative embodiment.

An event indication subscription in accordance with an illustrative embodiment for use in a Common Information Model is illustrated in FIG. 6. Subscription 600 is the association of filter instance 602 and handler instance 604. Filter 602 specifies selection criteria of indications. Handler 604 specifies where to send the matched indication.

In accordance with an illustrative embodiment, subscription 600 includes properties called "topLevelIndicationClass" and "correlatedIndicationClasses[ ]" or "InheritanceLevel". The topLevelIndicationClass and correlatedIndicationClassesH or InheritanceLevel properties of CIM_IndicationSubscription class 600 are used to prevent indication storms sent by a Common Information Model server when object behavior change is detected on a top level object in a hierarchy of objects in a Common Information Model. In accordance with an illustrative embodiment, these properties instruct a Common Information Model server to generate and send indications only for specified classes when object behavior change is detected in a top level object. The correlatedIndicationClasses[ ] and InheritanceLevel properties are meaningful only when a topLevelIndicationClass property is specified. The Common Information Model server only sends indication instances for classes specified in correlatedIndicationClasses[ ] or indicated by InheritanceLevel when object behavior change is detected on a top-level object. The Common Information Model server does not attempt to deliver indications for those classes not specified in the correlatedIndicationClassesH or indicated by InheritanceLevel when object behavior change is detected on a top level object.

In accordance with an illustrative embodiment, indication providers populate the correlatedIndications[ ] array in any generated indication with a top-level object indication identifier so that the Common Information Model server can identify related indications. Thus, all those indications created as part of a top-level object behavior change will have IndicationIdentifier of the top-level indication in corralted-Indications[ ] array. The Common Information Model server uses corraltedIndications[ ] array to identify correlated indications and filters them accordingly.

Usage of topLevelIndicationClass and correlatedIndicationClasses[ ] or InheritanceLevel is straight forward for an indication provider in a Common Information Model. The indication provider can check for the topLevelIndicationClass and correlatedIndicationClasses[ ] properties, or determine correlatedIndicationClasses[ ] from an indicated InheritanceLevel, and generate indications accordingly for each detected object behavior change. In this case, an indication is not even generated if an object behavior change does not correspond to the specified topLevelIndicationClass and specified correlatedIndicationClasses[ ] or correlatedIndicationClasses[ ] determined from a specified InheritanceLevel.

Figure 7:
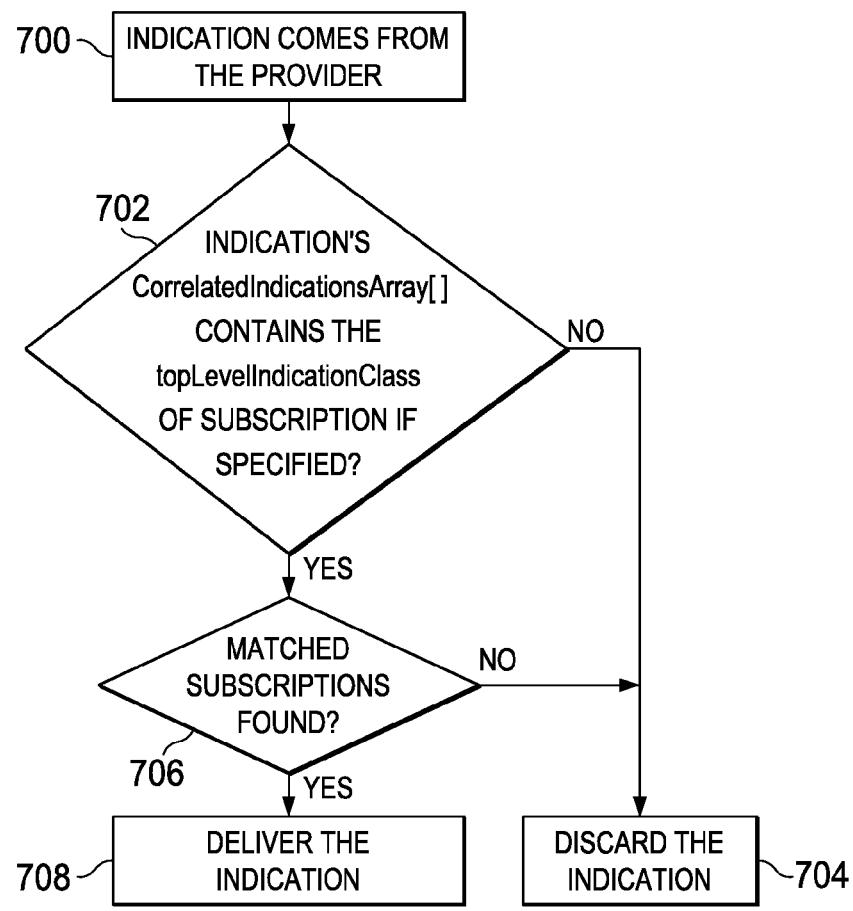
FIG. 7 is a flowchart of a method of indication delivery in accordance with an illustrative embodiment.

FIG. 7 is a flowchart of a method for evaluating indications in accordance with an illustrative embodiment that may be implemented in a Common Information Model server. In this case, indications are generated by and provided from an indication provider (step 700). The Common Information Model server must know the top-level indications and its correlated indications. To provide this information, the indication provider may populate CIM_Indication.CorrelatedIndications[ ] array of the generated indication with the top level indication instance identifier. Preferably, the name of the top-level class may be used as the indication identifier. The Common Information Model server determines whether the received indication's CorrelatedIndicationsArray[ ] contains the topLevelIndicationClass specified in a subscription (step 702). If it does not, the generated indication may be discarded (step 704). If it does, it is determined whether the indication matches the filter conditions defined in the subscription filter (step 706). If the indication matches the subscription, the indication may be delivered (step 708). Otherwise, the indication may be discarded at step 704.

Figure 8:
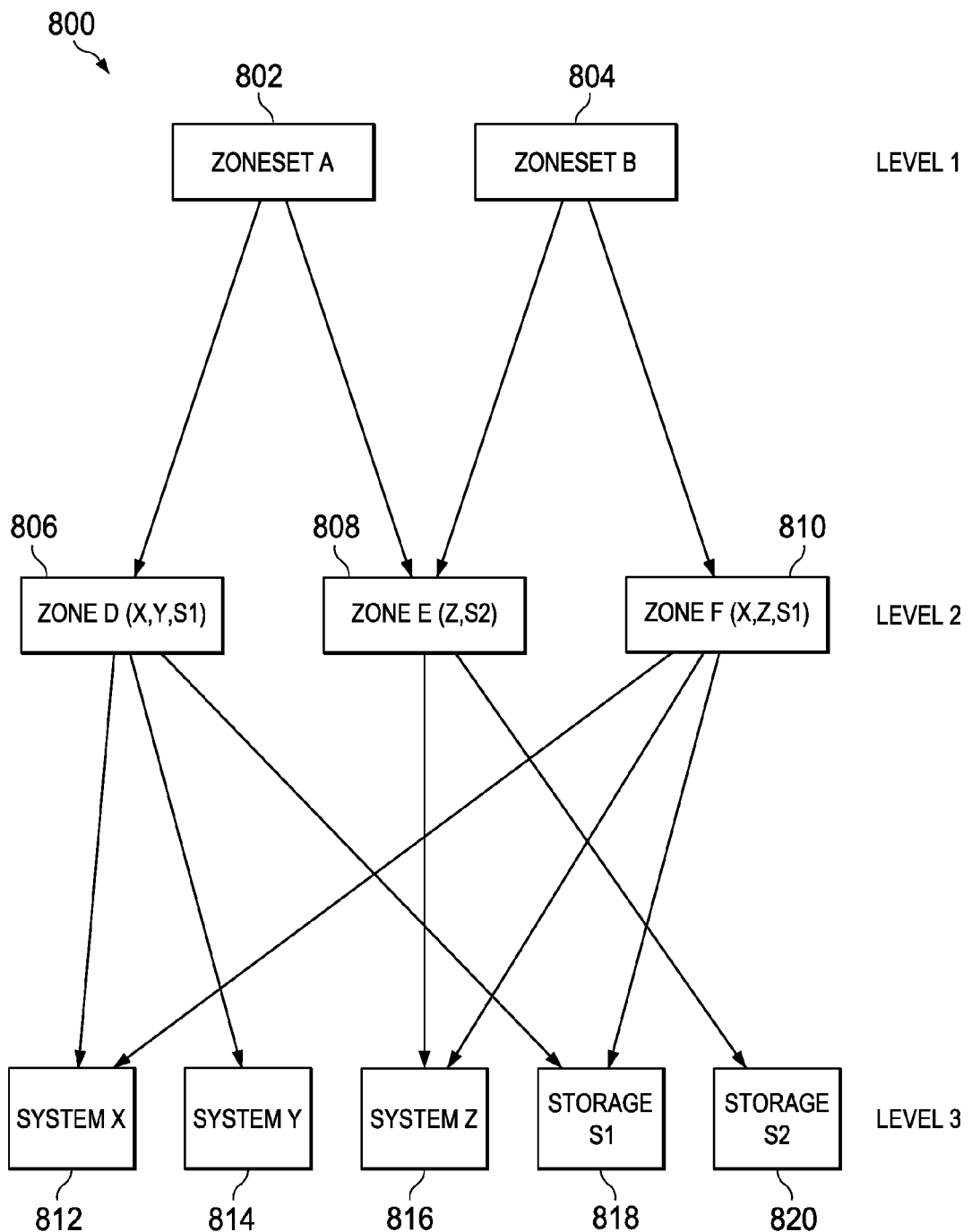
FIG. 8 is a block diagram of a network fabric for illustrating an example application of preventing indication storms in an event model in accordance with an illustrative embodiment.

FIG. 8 is a block diagram of a network fabric. FIG. 8 is presented for illustrating an example application of preventing indication storms in an event model in accordance with an illustrative embodiment. Network fabric 800 includes ZoneSet A 802, ZoneSet B 804, Zone D 806, Zone E 808, Zone F 810, System X 812, System Y 814, System Z 816, Storage S1 818, and Storage S2 820. Each of these elements of network fabric 800 may be represented as an object in a Common Information Model.

The illustrated elements of network fabric 800 are related to each other in a hierarchical relationship. ZoneSet A 802 and ZoneSet B 804 are at the top level of the hierarchy. We will call this Level 1. ZoneSet A 802 includes Zone D 806 and Zone E 808. ZoneSet B 804 includes Zone E 808 and Zone F 810. Thus, Zone D 806, Zone E 808, and Zone F 810 are at the next lower level of the hierarchy. We will call this Level 2. Zone D 806 includes System X 812, System Y 814, and Storage S1 818. Zone E 808 includes System Z 816 and Storage S2 820. Zone F 810 includes System X 812, System Z 816, and Storage S1 818. System X 812, System Y 814, System Z 816, Storage S1 818, and Storage S2 820 are the zone end points and thus are at the lowest level of the hierarchy. We will call this Level 3.

The hierarchical relationship of the elements of network fabric 800 is reflected in a hierarchical relationship of the objects that represent the elements of network fabric 800 in the Common Information Model. Thus, the levels of network fabric 800 may be reflected by corresponding levels of a class hierarchy in the Common Information Model.

Figure 9:
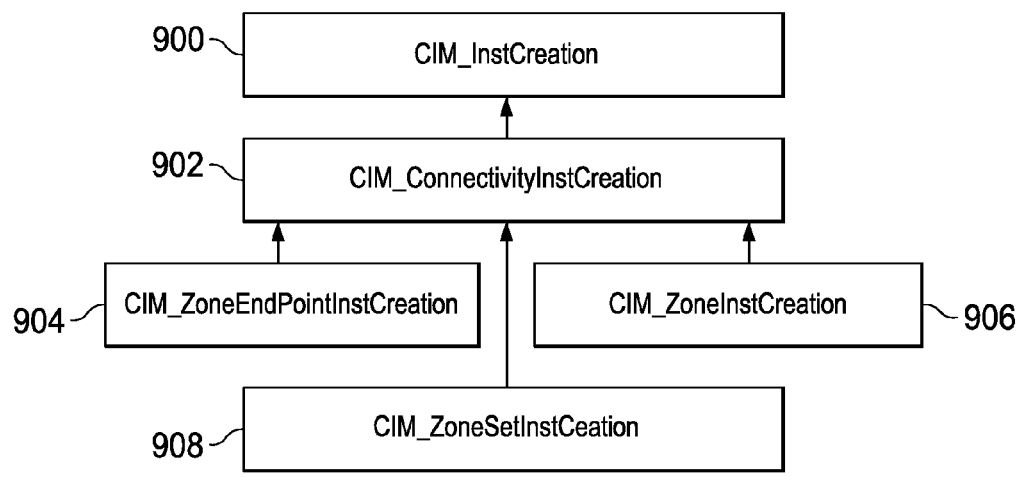
FIG. 9 is an illustration of a class hierarchy for instance creation in an event model for the network fabric illustrated in FIG. 8.

FIG. 9 is an illustration of a Common Information Model class hierarchy for instance creation in an event model for the network fabric illustrated in FIG. 8.

CIM_InstCreation 900 represents the generic instance creation class.

Class CIM_ConnectivityInstCreation: CIM_InstCreation 902 represents the generic connectivity instance creation.

Class CIM_ZoneEndPointInstCreation: CIM_ConnectivityInstCreation 904 represents endpoints or node systems in a zone, for example, a zone member in a fabric.

Class CIM_ZoneInstCreation: CIM_ConnectivityInstCreation 906 represents the creation of a connectivity collection, for example, a zone in a fabric.

Class CIM_ZoneSetInstCreation: CIM_ConnectivityInstCreation 908 represents the creation of a connectivity collection set, for example, a zoneset in a fabric.

In this example, correlated indications can be populated in the following way.

```
Instance of CIM_ZoneSetInstCreation
{
IndicationIdentifier = "ZoneSetA";
CorrelatedIndications = null;
};
Instance of CIM_ZoneInstCreation
{
IndicationIdentifier = "ZoneD";
CorrelatedIndications = {"ZoneSetA"};
};
Instance of CIM_ZoneInstCreation
{
IndicationIdentifier = "ZoneE";
CorrelatedIndications = {"ZoneSetA"};
};
Instance of CIM_ZoneEndPointInstCreation
{
IndicationIdentifier = "SystemX";
CorrelatedIndications = {"ZoneSetA", "ZoneD"};
};
Instance of CIM_ZoneEndPointInstCreation
{
IndicationIdentifier = "SystemY";
CorrelatedIndications = {"ZoneSetA", "ZoneD"};
};
Instance of CIM_ZoneEndPointInstCreation
{
IndicationIdentifier = "SystemZ";
CorrelatedIndications = {"ZoneSetA", "ZoneD"};
};
```

Continuing with the example being presented, an example instance of CIM_IndicationFilter in a subscription may be:

```
{
Name = "Filter1"
Query = "Select * FROM CIM_ConnectivityCollection";
}
```

An example instance of CIM_ListenerDestination in the subscription may be:

```
{
Name = "Destination1";
Destination = "http://localhost:5988/CIMListener/dest1";
}
```

In a first example scenario in accordance with an illustrative embodiment, no value is specified for topLevelIndicationClass and correlatedIndicationClasses[ ] properties in the subscription. In this case, an example instance of CIM_IndicationSubscription may be:

```
{
Filter= "CIM_IndicationFilter .Name=\"Filter1\"";
Handler = "CIM_ListenerDestination .Destination=\"Destination1\"";
topLevelIndicationClass = NULL;
correlatedIndicationClasses[ ] = NULL;
};
```

In this scenario, when ZoneSet A is activated in the network fabric, one indication is sent for ZoneSet A, two indications are sent for Zones D and E, and five indications for are sent for zone endpoints Systems X, Y and Z, and Storage 51 and S2. In this case, activation of a ZoneSet from one of the member switches in a fabric may result in sending InstanceCreation lifecycle indications for each member in the ZoneSet collection to indication listeners.

In a second scenario, only a top level indication class is specified. In this case, an example instance of CIM_IndicationSubscription may be:

```
{
  Filter= "CIM_IndicationFilter .Name=\"Filter1\"";
Handler = "CIM_ListenerDestination .Destination=\"Destination1\"";
topLevelIndicationClass = "CIM_ZoneSetInstCreation";
correlatedIndicationClasses[ ] = NULL;
};
```

In this scenario, when ZoneSet A is activated in the network fabric, only one indication is sent for ZoneSet A.

In a third scenario, the top level class and its correlated classes are established in the subscription. In this case, an example instance of CIM_IndicationSubscription may be:

```
{
Filter= "CIM_IndicationFilter .Name=\"Filter1\"";
Handler = "CIM_ListenerDestination .Destination=\"Destination1\"";
topLevelIndicationClass = "CIM_ZoneSetInstCreation";
correlatedIndicationClasses[ ] ={ "CIM_ZoneInstCreation"};
};
```

In the third scenario, when ZoneSet A is activated in the network fabric, one indication is sent for ZoneSet A and two indications are sent for Zones D and E.

In a final example scenario, the top level class is specified in the subscription, but the correlated classes for which indications are to be sent are indicated by inheritance level. In this case, an example instance of CIM_IndicationSubscription may be:

```
{
Filter= "CIM_IndicationFilter .Name=\"Filter1\"";
Handler = "CIM_ListenerDestination .Destination=\"Destination1\"";
topLevelIndicationClass = "CIM_ZoneSetInstCreation";
InheritanceLevel=2;
};
```

In the final example scenario, the inheritance level identifies the class hierarchy level. Therefore, in this case, each individual class in the class hierarchy need not be specified in the subscription.

A method of providing event indications in accordance with an advantageous embodiment may be applied to alert indications and to lifecycle indications other than those presented in the previous example. Such a method also can be implemented by unrelated classes, if the object correlations are known. In this case, the object correlations may establish a class hierarchy among the unrelated classes.

A method of providing event indications in accordance with an illustrative embodiment applies when object behavior change is detected in a top level object. Component level instances may still send their own indications if correlatedIndications Array is not populated.

Implementation of a method of providing event indications in accordance with an illustrative embodiment does not affect any existing subscriptions. A method in accordance with an advantageous embodiment can be generalized to all models designed on object oriented programming concepts.

One or more of the illustrative embodiments thus provides a capability to provide event indications in an event model, wherein detected object behavior changes correspond to detected events. By providing for the specification of a top level indication class in an indication subscription, an indication of interest may be sent to a listener process only when a detected object behavior change corresponds to the specified top level indication. In this manner, the generation and delivery of indications can be controlled in cases where object behavior change in a top level object otherwise might result in the generation and delivery of many indications. Thus, one or more of the illustrative embodiments provides the capability to prevent indication storms that might harm system performance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with any system, apparatus, or device for running a program. A computer readable storage medium specifically excludes a propagating signal.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with any system, apparatus, or device for running a program.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the illustrative embodiments provided herein has been presented for purposes of illustration and explanation, but is not intended to be exhaustive or to limit the invention to the form disclosed. Many modifications and variations will be apparent to those of ordinary skill in the art without departing from the scope and spirit of the invention. The illustrative embodiments were chosen and described in order to best explain the principles of the invention and the practical application, and to enable others of ordinary skill in the art to understand the invention for various embodiments with various modifications as are suited to the particular use contemplated.

What is claimed is:

1. A method of preventing event indication storms in a network having a Common Information Model server, the method comprising:

a computer configured as the Common Information Model server, wherein the Common Information Model server includes elements related to each other at levels forming an indication class hierarchy, the indication class hierarchy having higher levels and lower levels and wherein the Common Information Model server generates and delivers indications of an event to a listener process for all instances including the higher levels and the lower levels in a period of time, and wherein a number of indications of interest generated and delivered in the period of time comprises an indication storm;

the computer receiving, from the listener process, a specific top level indication class in the indication class hierarchy, wherein the specific top level indication class corresponds to one or more of the higher levels;

the computer detecting an object behavior change in an information model, wherein the object behavior change corresponds to an event;

the computer determining that the event corresponds to the specific top level indication class in the indication class hierarchy; and the computer, responsive to determining that the event corresponds to the specific top level indication class in the indication class hierarchy, generating and delivering an indication of interest to the listener process only for the one or more of the higher levels in the period of time, so that the number of indications of interest generated and delivered in the period of time does not comprise an indication storm.

2. The method of claim 1 further comprising:

The computer sending a further indication of interest to the listener process for a specified correlated indication class in the indication class hierarchy in response to the detected object behavior change corresponding to the specified top level indication class, wherein the correlated indication class is below the top level indication class in the indication class hierarchy.

3. The method of claim 2, wherein the top level indication class and the correlated indication class are specified in a subscription.

4. The method of claim 3, wherein the correlated indication class is specified in the subscription by an inheritance level.

5. The method of claim 3, wherein the subscription is a subscription in a Common Information Model event model.

6. The method of claim 1 further comprising:

the computer generating an indication in response to detecting the object behavior change;

the computer determining whether the generated indication corresponds to the specified top level indication class; and the computer sending the generated indication to the listener process as the indication of interest in response to determining that the generated indication corresponds to the specified top level indication class.

7. The method of claim 1 further comprising:

the computer determining whether the object behavior change corresponds to the specified top level indication class; and the computer generating the indication of interest in response to determining that the object behavior change corresponds to the specified top level indication class.

8. A computer program product for preventing event indication storms in a network having a Common Information Model server, the computer program product comprising:

one or more non-transitory computer readable storage mediums;

computer program instructions stored on at least one non-transitory computer readable storage medium for configuring the Common Information Model server, wherein the Common Information Model server includes elements related to each other at levels forming an indication class hierarchy, the indication class hierarchy having higher levels and lower levels and wherein the Common Information Model server generates and delivers indications of an event to a listener process for all instances including the higher levels and the lower levels in a period of time, and wherein a number of indications of interest generated and in the period of time comprises an indication storm;

computer program instructions stored on at least one non-transitory computer readable storage medium for execution by at least one processor via at least one computer readable memory for receiving, from the listener process, a specific top level indication class in the indication class hierarchy, wherein the specific top level indication class corresponds to one or more of the higher levels;

computer program instructions stored on at least one non-transitory computer readable storage medium for detecting an object behavior change in an information model, wherein the object behavior change corresponds to an event;

computer program instructions stored on at least one non-transitory computer readable storage medium for determining that the event corresponds to the specific top level indication class in the indication class hierarchy; and computer program instructions stored on at least one non-transitory computer readable storage medium for, responsive to determining that the event corresponds to the specific top level indication class in the indication class hierarchy, generating and delivering an indication of interest to the listener process only for the one or more of the higher levels in the period of time, so that the number of indications of interest generated and delivered in the period of time does not comprise an indication storm.

9. The computer program product of claim 8 further comprising:

computer program instructions stored on the at least one non-transitory computer readable storage medium for controlling the data processing system to send a further indication of interest to the listener process for a specified correlated indication class in the indication class hierarchy in response to the detected object behavior change corresponding to the specified top level indication class, wherein the correlated indication class is below the top level indication class in the indication class hierarchy.

10. The computer program product of claim 9, wherein the top level indication class and the correlated indication class are specified in a subscription.

11. The computer program product of claim 10, wherein the correlated indication class is specified in the subscription by an inheritance level.

12. The computer program product of claim 10, wherein the subscription is a subscription in a Common Information Model event model.

13. The computer program product of claim 8 further comprising:

computer program instructions stored on the at least one non-transitory computer readable storage medium for controlling the data processing system to generate an indication in response to detecting the object behavior change;

computer program instructions stored on the at least one non-transitory computer readable storage medium for controlling the data processing system to determine whether the generated indication corresponds to the specified top level indication class; and computer program instructions stored on the at least one non-transitory computer readable storage medium for controlling the data processing system to send the generated indication to the listener process as the indication of interest in response to determining that the generated indication corresponds to the specified top level indication class.

14. The computer program product of claim 8 further comprising:

computer program instructions stored on the at least one non-transitory computer readable storage medium for controlling the data processing system to determine whether the object behavior change corresponds to the specified top level indication class; and computer program instructions stored on the at least one non-transitory computer readable storage medium for controlling the data processing system to generate the indication of interest in response to determining that the object behavior change corresponds to the specified top level indication class.

15. An apparatus for preventing event indication storms in a network having a Common Information Model server, comprising:

one or more processors, one or more computer readable memories, and one or more computer readable storage devices;

computer program instructions stored on at least one computer readable storage device for execution by at least one processor via at least one computer readable memory for configuring the Common Information Model server, wherein the Common Information Model server includes elements related to each other at levels forming an indication class hierarchy, the indication class hierarchy having higher levels and lower levels and wherein the Common Information Model server generates and delivers indications of an event to a listener process for all instances including the higher levels and the lower levels in a period of time, and wherein a number of indications of interest generated and delivered in the period of time comprises an indication storm;

computer program instructions stored on at least one computer readable storage device for execution by at least one processor via at least one computer readable memory for receiving, from the listener process, a specific top level indication class in the indication class hierarchy, wherein the specific top level indication class corresponds to one or more of the higher levels;

computer program instructions stored on at least one computer readable storage device for execution by at least one processor via at least one computer readable memory for detecting an object behavior change in an information model, wherein the object behavior change corresponds to an event;

computer program instructions stored on at least one computer readable storage device for execution by at least one processor via at least one computer readable memory for determining that the event corresponds to the specific top level indication class in the indication class hierarchy; and computer program instructions stored on at least one computer readable storage device for execution by at least one processor via at least one computer readable memory for, responsive to determining that the event corresponds to the specific top level indication class in the indication class hierarchy, generating and delivering an indication of interest to the listener process only for the one or more of the higher levels in the period of time, so that the number of indications of interest generated and delivered in the period of time does not comprise an indication storm.

16. The apparatus of claim 15, wherein the data processing system is further adapted to:

computer program instructions stored on at least one computer readable storage device for execution by at least one processor via at least one computer readable memory for sending a further indication of interest to the listener process for a specified correlated indication class in the indication class hierarchy in response to the detected object behavior change corresponding to the specified top level indication class, wherein the correlated indication class is below the top level indication class in the indication class hierarchy.

17. The apparatus of claim 16, wherein the top level indication class and the correlated indication class are specified in a subscription.

18. The apparatus of claim 17, wherein the correlated indication class is specified in the subscription by an inheritance level.

19. The apparatus of claim 17, wherein the subscription is a subscription in a Common Information Model event model.

20. The apparatus of claim 15, further comprising:

computer program instructions stored on at least one computer readable storage device for execution by at least one processor via at least one computer readable memory for generating, an indication in response to detecting the object behavior change;

computer program instructions stored on at least one computer readable storage device for execution by at least one processor via at least one computer readable memory for determining whether the generated indication corresponds to the specified top level indication class; and computer program instructions stored on at least one computer readable storage device for execution by at least one processor via at least one computer readable memory for sending the generated indication to the listener process as the indication of interest in response to determining that the generated indication corresponds to the specified top level indication class.

21. The apparatus of claim 15, further comprising:

computer program instructions stored on at least one computer readable storage device for execution by at least one processor via at least one computer readable memory for determining whether the object behavior change corresponds to the specified top level indication class; and computer program instructions stored on at least one computer readable storage device for execution by at least one processor via at least one computer readable memory for generating the indication of interest in response to determining that the object behavior change corresponds to the specified top level indication class.

* * * * *